March 3, 1970   C. TROUW   3,498,028
APPARATUS FOR CONTACTING LIQUIDS AND GASES
Filed June 19, 1967   2 Sheets-Sheet 1

INVENTOR:
CORNELIS TROUW
BY: *Louis J. Bovasso*
HIS ATTORNEY

March 3, 1970 C. TROUW 3,498,028
APPARATUS FOR CONTACTING LIQUIDS AND GASES
Filed June 19, 1967 2 Sheets-Sheet 2

INVENTOR:
CORNELIS TROUW
BY: *Louis J. Bovasso*
HIS ATTORNEY

United States Patent Office 3,498,028
Patented Mar. 3, 1970

3,498,028
APPARATUS FOR CONTACTING LIQUIDS
AND GASES
Cornelis Trouw, Amsterdam, Netherlands, assignor to Shell Oil Company, New York, N.Y., a corporation of Delaware
Filed June 19, 1967, Ser. No. 646,875
Claims priority, application Netherlands, June 22, 1966, 6608631
Int. Cl. B01d 47/10
U.S. Cl. 55—237          9 Claims

ABSTRACT OF THE DISCLOSURE

A liquid-vapor contacting apparatus comprising a cylindrical vessel having a vapor inlet at one end and a vapor outlet at the opposite end with liquid inlets protruding into the vessel not more than 30% of the inner diameter of the vessel. A set of overlapping, arcuately-spaced vanes extend radially from substantially the longitudinal center line of the vessel at a point upstream of the liquid and vapor inlet in order to impart rotational movement to the mixture of vapor and liquid.

BACKGROUND OF THE INVENTION

Field of the Invention

The invention relates to apparatus for improving the contacting of liquids and gases and; more particularly, apparatus for passing a mixture of liquid and gases in co-current flow while imparting rotational movement to the mixture.

Description of the Prior Art

Prior art apparatuses for contacting liquids and gases consist of a chamber enclosed by a tubular lateral wall, which chamber is open on either end and provided on one end with means for the separate supply of liquid and of gas and on the other end with means for the separate discharge of liquid and of gas. In these apparatuses, it is possible for the liquid and the gas to be passed through that chamber in co-current flow while within that chamber the gas is the continuous phase during the process of exchange. Also, within that chamber are one or more components which are capable of imparting a rotational movement to the mixture of liquid droplets and gas.

The contact between liquid and gas in such prior art apparatuses is effected mainly by causing the liquid within the tubular chamber to be entirely or largely atomized. For this purpose, special means may have been provided, such as an atomizer at the end of a liquid supply line that terminates centrally in the chamber. It is also possible for the liquid to be distributed on the inlet end over the inner wall, from whence liquid owing to the action of the vapor brushing along it is atomized, which atomization may be promoted by roughening the surface of the wall. In this way the area of the surface of contact between liquid and gas is made very large, so that a high mass transfer between the two phases becomes possible. After the contact, the two phases have to be separated again, which is achieved by imparting a rotational movement to the mixture of liquid droplets and gas, for instance, with the aid of a fixed vane deck. The droplets will then be flung centrifugally against the wall of the tubular chamber, and the liquid layer thus formed can then flow off through apertures or slits in that wall or over the rim of that wall on the side of the outlet. The vane deck may be located in various places in the tubular chamber. It is also possible for two vane decks to be present in each apparatus.

It is possible for two or more contacting apparatuses, connected to a common liquid supply and a common gas supply, to be placed in parallel within an enclosing wall, which may be advantageous with a view to increasing the capacity. In order to increase the separating efficiency, a column may be formed from contacting apparatuses placed coaxially in series, the gas being passed to the following stage and the liquid to one of the preceding stages. A column of this type may also consist of two or more plates carrying contacting apparatuses placed in parallel. With contacting apparatuses placed coaxially in series the gas will continuously be in rotational motion.

Contacting apparatuses of the type discussed hereinbefore may be heavily loaded with liquid and with vapor. The use of a high vapor load has advantages in relation to the atomization of liquid, which hereby is promoted. The separation of liquid droplets by rotation is also promoted by a high vapor load, because the centrifugal forces increase with increasing vapor load. Operating at such a high load, special measures are necessary in order to accommodate this large supply of liquid.

SUMMARY OF THE INVENTION

It is an object of this invention to provide improved means for accommodating a large supply of liquid in a liquid-vapor contacting apparatus.

A cylindrical vessel having a vapor inlet at one end and a vapor outlet at the other end is provided with at least one set of overlapping, arcuately-spaced vanes extending radially of the longitudinal center line of the vessel. This vane deck is upstream of the vapor inlet in order to impart rotational movement to the mixture of vapor and liquid. In accordance with the invention, an improved mean of supplying liquid to the vessel is provided. One or more liquid supply ducts protrude from the inner wall of the vessel downstream of the vane deck. These ducts extend towards the center line of the vessel not more than 30% of the cross-sectional diameter of the vessel.

The amount of liquid that can be supplied to a liquid-vapor contacting apparatus is determined by the available liquid pressure, the pressure in the contacting apparatus and the resistance which the liquid encounters in the liquid supply duct. As the centrifugal forces generated by the rotation of the gas by the vanes are less strong towards the center of the vessel than near the wall of the vessel, the liquid encounters less back pressure, as a result of which the outflow is facilitated. At the same time, care should be taken that the resistance to the vapor flow is not unduly increased. The ducts for the supply of liquid which extend towards the inside are in the vapor flow. Thus, the distance over which the ducts protrude is limited to at most 30% of the diameter of the space within the tubular lateral wall, a sufficiently large aperture remaining for the flowing vapor.

It is always possible within the purview of the invention to reach a favorable compromise between the intended increase in the outflow of liquid and the intended reduction of resistance to vapor flow. If, for attaining a desired exchange, the available vapor flow permits a larger supply of liquid, then, if the ducts for the supply of liquid protrude farther towards the inside, the supply of liquid will increase and the vapor flow decrease, so that the optimum ratio between liquid flow and vapor flow is approximated more closely or is actually reached. If the vapor flow is too small for a desired exchange to be reached, then, if the ducts for the supply of liquid protrude less far to the inside, the supply of liquid will decrease and the vapor flow increase, which, again, will be promotive to the optimum ratio between liquid flow and vapor flow being approximated or actually reached.

Naturally, favorable results can be obtained if those sections of the ducts for the supply of liquid that are located in the vapor flow are suitably streamlined. Also, those sections may be shaped in such a way that a rotational movement is imparted to the vapor brushing along them. Furthermore, the shape of the outlet may be adapted to the direction of the vapor flow in order to ensure an easy outflow of liquid.

The arrangement whereby the ducts for the supply of liquid protrude towards the inside tends to prevent the liquid from flowing down along the wall of the contacting apparatus. This favorable effect is apparent particularly at low vapor loads.

It is advantageous for the underside of the outlet of a supply duct to lie at least at the level of the upper side of the inlet of that supply duct. Provision for this can be made by arranging such a supply duct so as to be at an angle above the horizontal or by using curved supply ducts. In this way the outflow of vapor via the supply ducts is prevented. Then the presence of a separate liquid seal at the entrance of a supply duct is not required.

DESCRIPTION OF THE PREFERRED EMBODIMENTS

Figure 1:
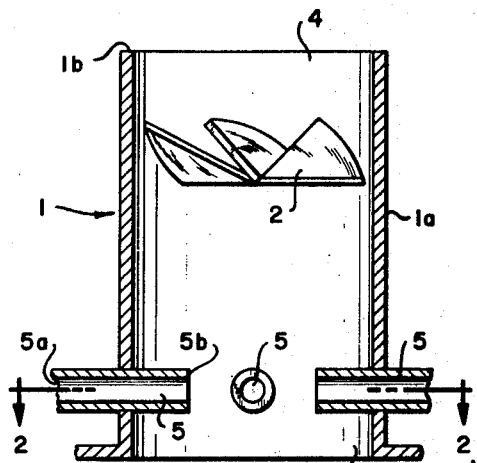
FIGURE 1 is a vertical sectional view of one embodiment of a liquid-vapor contacting apparatus for carrying out the concepts of the invention.
Figure 2:
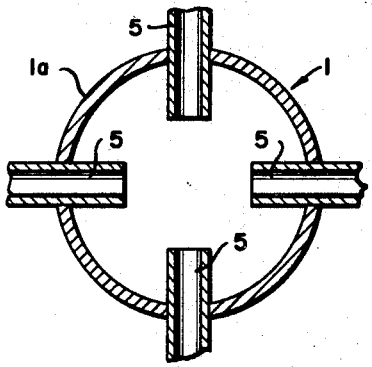
FIGURE 2 is a sectional view taken along line 2—2 of FIGURE 1.

Referring first to FIGURES 1 and 2, there is illustrated a liquid-vapor contacting chamber 1 through which a gas or vapor stream may be passed. A vane deck 2, comprised of arcuately-spaced overlapping vanes, extends radially of substantially the center line of the chamber 1 and is positioned within the chamber in order to impart rotational movement to the liquid-vapor mixture flowing therein. The chamber 1 of FIGURES 1 and 2 has a tubular contacting wall 1a. Vapor enters the chamber 1 through aperture 3 and exits through the aperture 4 opposite to aperture 3 in wall 1a. Liquid is supplied to chamber 1 through ducts 5 which protrude through the tubular contacting wall 1a of chamber 1. Ducts 5 extend towards the center line of chamber 1 over a distance limited to at most 30% of the cross-sectional diameter of tubular contacting wall 1a. Each duct 5 has an inlet end 5a communicating with an outlet end 5b located internally of tubular wall 1a. As discussed previously, the optimum ratio between liquid flow and vapor flow can be approximated more closely in this manner.

In operation, gas and liquid, introduced into chamber 1 through aperture 3 and ducts 5, respectively, pass through in co-current flow with the vane deck 2 imparting rotational movement to the mixture of liquid droplets and gas. The liquid droplets are flung centrifugally against the inner wall 1a of chamber 1 and the liquid layer thus formed can then flow off through apertures or slits (not shown) in wall 1a or over the rim 1b of wall 1a at the vapor outlet end of chamber 1.

Figure 3:
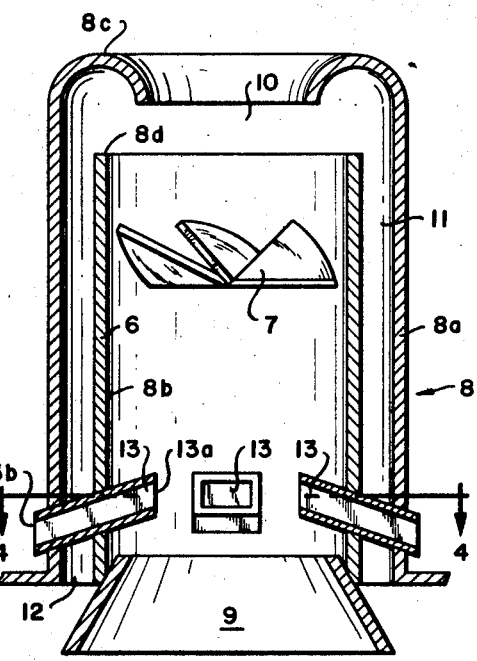
FIGURE 3 is a vertical sectional view of an alternate embodiment of the invention.
Figure 4:
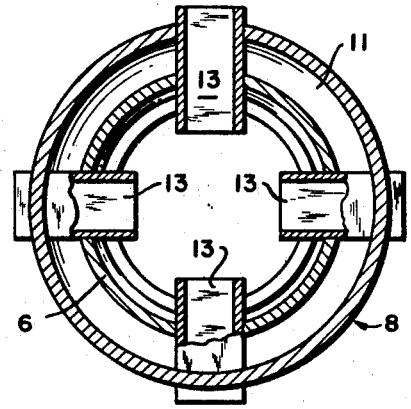
FIGURE 4 is a sectional view taken along line 3—3 of FIGURE 3.

In the embodiment of FIGURES 3 and 4, the chamber 8 comprises a tubular outer wall 8a and a tubular inner wall 6. Inner wall 6 is similar to wall 1a of the embodiment of FIGURE 1; inner wall 6 has a vapor inlet 9 in the form of an open-ended truncated cone fixedly mounted on the inner portion 8b of inner wall 6 as can be seen in FIGURE 3. Outer wall 8a surrounds inner wall 6 and extends vertically above wall 6 and is curved at 8c inwardly and downwardly towards the center line of wall 6 and beyond the annular space 11 formed between walls 6 and 8a for reasons to be discussed hereinbelow. The vapor exit aperture 10 formed by outer wall 8a communicates with the inner wall 6. A vane deck 7, similar to vane deck 2 of FIGURE 1, is positioned within inner wall 6 and upstream of vapor inlet 9 as discussed previously concerning vane deck 2. A plurality of liquid inlet ducts 13 extend towards the center line of inner wall 6 over a distance limited to at most 30% of the cross-sectional diameter of inner wall 6. The ducts 13, four such ducts being shown in FIGURES 3 and 4, are angled upwardly so that the underside of the outlet portion 13a of ducts 13 is at substantially the same horizontal level as the upper side of the inlet portion 13b as can be seen in FIGURE 3. The ducts 13 receive liquid from a supply source (not shown) outside of the chamber 8. The operation of the apparatus is similar to that of FIGURES 1 and 2; the vapor enters vapor inlet 9 and exits through vapor outlet 10. The liquid, introduced through ducts 13, is flung outwardly by vane deck 7 against the inner portion 8b of inner wall 6. The liquid thus flung passes over the rim 8d of inner wall 6 and is collected in the annular space 11 formed between the two walls 6 and 8a. The collected liquid is preferably discharged through an aperture 12 at the bottom of annular space 11 and into the supply source (not shown) outside the chamber 8. The upwardly angling of ducts 13, as discussed previously, prevents the outflow of vapor through the liquid supply ducts 13, thus eliminating the necessity for a separate liquid seal at the outlet portions 13a of the supply ducts 13.

Figure 5:
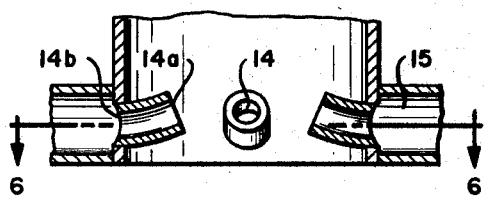
FIGURES 5, 7 and 9 are vertical sectional views of further embodiments of the invention.
Figure 6:
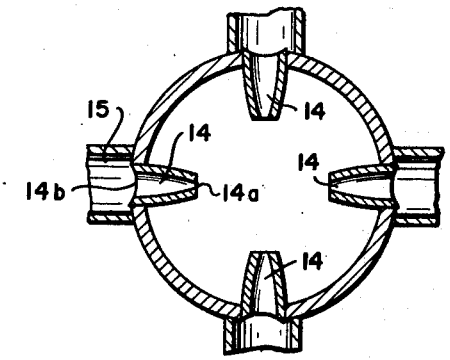
FIGURES 6, 8 and 10 are sectional views taken along lines 6—6, 8—8 and 10—10, respectively, of FIGURES 5, 7 and 9.
Figure 9:
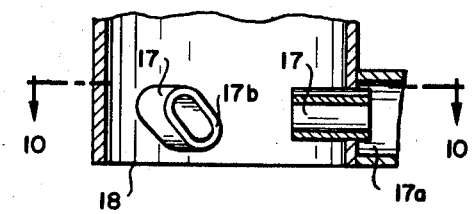
Figure 7:
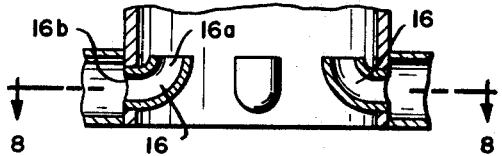
Figure 10:
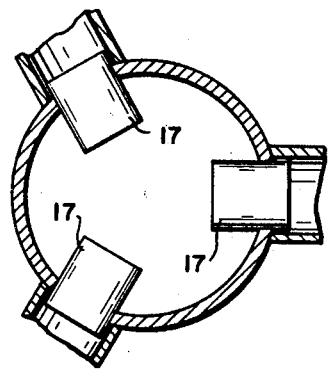
Figure 8:
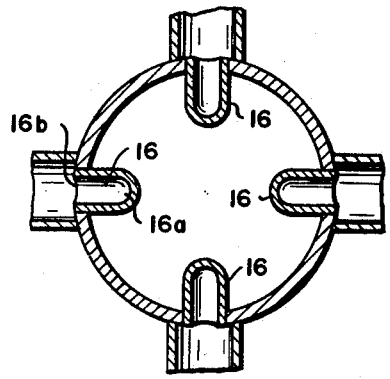

The embodiments of FIGURES 5, 7 and 9 are similar to each other and show various streamlining of the liquid supply ducts which may be incorporated in the chambers of FIGURES 1 and 3. The supply duct 14 of FIGURES 5 and 6 is slightly curved in the upward direction as can be seen in FIGURE 5. Here, the underside of the outlet portion 14a of duct 14 is on substantially the same horizontal level as the center line of both the inlet portion 14b and the liquid storage vessel 15 communicating with duct 14. The outlet portions 14a of ducts 14 are also tapered inwardly towards the center line of the outlet portions 14a as seen in FIGURE 6, thereby presenting a curved surface for preventing incoming vapors from vapor inlet 9 from entering ducts 14.

The duct 16 of the embodiment of FIGURE 7 is curved so far upwardly that the center of the outlet portion 16a is substantially parallel to the center line of the chamber and substantially perpendicular to the center line of the liquid storage vessel 16b communicating with duct 16. These embodiments of FIGURES 5 and 7 promote the outflow of liquid and impede the flow of vapor through the ducts illustrated.

In FIGURE 9, a final embodiment shows liquid supply ducts 17 which communicate with a liquid storage vessel 17a. Ducts 17 are so streamlined that the underside of the outlet portion 17b of ducts 17 presents a substantially closed horizontal surface to incoming vapors. The outlet portion 17b is slanted or angled with relation to the center line of the chamber such that outgoing liquid is directed outwardly and upwardly towards the vane deck (not shown) and away from the vapor inlet end 18 as can best be seen in FIGURE 9. Thus, the shape of the ducts 17 is such to ensure an easy outflow of liquid and prevent the outflow of vapor through ducts 17. The ducts 17 present a closed surface to any vapor flowing from inlet end 18 towards the vapor outlet end (not shown).

I claim:
1. Apparatus for contacting liquids and gases comprising:
   a tubular wall structure forming a chamber and having a vapor inlet end and a vapor outlet end in communication with one another through said chamber;
   a liquid inlet means protruding from the tubular wall structure and extending inwardly towards the center line of the tubular wall structure over a substantial distance limited to at most 30% of the cross-sectional diameter of the chamber; and mixture rotational means mounted in said chamber and disposed upstream of both the vapor inlet end and the liquid inlet means and adapted to impart a rotational movement to a mixture of liquid and vapor flowing within the apparatus.

2. The apparatus of claim 1 wherein the liquid inlet means comprises a plurality of liquid supply ducts, and each of said ducts having an inlet portion in communication with an outlet portion located internally of said tubular wall and angled upwardly such that the underside of the outlet portion of the duct is at substantially the same horizontal level as the upper side of the inlet portion of the duct.

3. The apparatus of claim 2 including an outer tubular wall structure surrounding the first tubular wall structure, thereby forming an annular space therebetween; and the upper end of said outer tubular wall structure extending vertically above the first tubular wall structure and curved inwardly and downwardly towards the center line of the first tubular wall structure beyond the annular space formed between the first and outer tubular wall structures.

4. The apparatus of claim 3 including a liquid outlet communicating with the annular space formed between the first and outer tubular wall structures.

5. The apparatus of claim 1 wherein said liquid supply means comprises a plurality of liquid supply ducts, each of said ducts having an inlet portion communicating with an outlet portion located internally of said tubular wall structure, said ducts being curved upwardly so that the undersides of the outlet portions of the ducts are on substantially the same horizontal level as the center line of the inlet portion and the outlet portion of all of said ducts being tapered inwardly towards the center line of the outlet portion, thereby presenting a curved surface for preventing incoming vapors from the vapor inlet from entering said ducts.

6. The apparatus of claim 1 wherein:

said liquid supply means comprises a plurality of liquid supply ducts, each of said ducts having an inlet portion communicating with an outlet portion located internally of said tubular wall structure, said ducts being curved upwardly so that the center line of the outlet portion is substantially parallel to the center line of the tubular wall structure.

7. The apparatus of claim 1 wherein said liquid supply means comprises a plurality of liquid supply ducts, each of said ducts having an inlet portion communicating with an outlet portion, all of said liquid outlet portions being located internally of the tubular wall structure and being so angled with relation to the center line of the tubular wall structure as to direct any liquid exiting from the ducts away from the vapor inlet end of the tubular wall and present a closed surface to any vapor flowing from the vapor inlet end towards the vapor outlet end of the tubular wall structure.

8. Apparatus for contacting liquids and gases comprising:

a tubular wall structure forming a chamber and having a vapor inlet end and a vapor outlet end in communication with one another through said chamber;

said vapor inlet end comprising a truncated cone integral with said tubular wall structure, the narrower end of said cone opening inwardly towards said vapor outlet end and so as to direct vapors towards the interior of said wall structure;

liquid inlet means substantially equally spaced about said tubular wall structure and protruding from the tubular wall structure and extending inwardly towards the center line of the tubular wall structure over a substantial distance limited to at most 30% of the cross-sectional diameter of the chamber;

said liquid inlet means comprising a plurality of liquid supply ducts, each of said ducts being generally rectangular in cross section and having an inlet portion in communication with an outlet portion located internally of said tubular wall and angled upwardly such that the underside of the outside portion of the duct is at substantially the same horizontal level as the upper side of the inlet portion of the ducts;

all of the circumferential points of the outlet portions of said ducts lying in a first respective vertically extending plane and all of the circumferential points of the inlet portions of said ducts lying in a second respective vertical plane parallel to the first respective vertical plane;

mixture rotational means mounted in said chamber and disposed upstream of both the vapor inlet end and the liquid inlet means and adapted to impart a rotational movement to a mixture of liquid and vapor flowing within the apparatus;

an outer tubular wall structure surrounding the first tubular wall structure thereby forming an annular space therebetween;

the upper end of said outer tubular wall structure extending vertically above the first tubular wall structure and curved inwardly and downwardly towards the center line of the first tubular wall structure substantially beyond the annular space formed between the first and outer tubular wall structures thereby forming an outer tubular wall structure outlet of a lesser cross-sectional diameter than the cross-sectional diameter of said first tubular wall structure;

a liquid outlet communicating with the annular space formed between the first and outer tubular wall structures; and outwardly extending tray means cooperating with the lower end of the outer tubular wall structure for supplying liquid thereon to said liquid inlet means.

9. The apparatus of claim 9 wherein said ducts are four equally spaced ducts disposed circumferentially of said first tubular wall structure.

References Cited

UNITED STATES PATENTS

| | | |
|---|---|---|
| 1,149,322 | 8/1915 | Baker. |
| 1,511,749 | 10/1924 | Powell. |
| 1,625,997 | 4/1927 | Gronkwist. |
| 2,353,865 | 7/1944 | Armstrong. |
| 2,684,231 | 7/1954 | Pomykala. |
| 2,833,530 | 5/1958 | Martin _____ 261—78 X |
| 3,294,381 | 12/1966 | Schwartz _____ 55—257 X |
| 3,296,774 | 1/1967 | Hoogendoorn et al. ____ 55—92 |
| 3,304,694 | 2/1967 | Manger et al. _____ 55—238 |
| 3,345,046 | 10/1967 | Versluys et al. _____ 55—257 X |

FOREIGN PATENTS 604,031    4/1960    Italy.

OTHER REFERENCES

Netherlands printed application No. 300,388, printed Sept. 10, 1965.

HARRY B. THORNTON, Primary Examiner

D. E. TALBERT, Jr., Assistant Examiner

U.S. Cl. X.R.

55—257, 396, 456; 261—78, 79, 114, 116, 118